US012738159B2

(12) United States Patent
Mousapoursiahgourab et al.

(10) Patent No.: US 12,738,159 B2
(45) Date of Patent: Sep. 15, 2026

(54) SYSTEM AND METHOD FOR OPERATING A TRAFFIC MANAGEMENT SYSTEM BASED ON PRIORITY VEHICLE ARRIVAL TIME

(71) Applicant: DENSO International America, Inc., Southfield, MI (US)

(72) Inventors: Fatemeh Mousapoursiahgourab, Ann Arbor, MI (US); Rajesh Malhan, Troy, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 19/083,506

(22) Filed: Mar. 19, 2025

(65) Prior Publication Data

US 2025/0299569 A1 Sep. 25, 2025

Related U.S. Application Data

(60) Provisional application No. 63/567,629, filed on Mar. 20, 2024.

(51) Int. Cl.
*G08G 1/087* (2006.01)
*G08G 1/01* (2006.01)

(52) U.S. Cl.
CPC ........... *G08G 1/087* (2013.01); *G08G 1/0116* (2013.01); *G08G 1/0129* (2013.01); *G08G 1/0133* (2013.01)

(58) Field of Classification Search
CPC .... G08G 1/087; G08G 1/0116; G08G 1/0129; G08G 1/0133
USPC .......................................................... 340/906
See application file for complete search history.

(56) References Cited

U.S. PATENT DOCUMENTS

| | | | | |
|---|---|---|---|---|
| 10,650,673 | B1 * | 5/2020 | Elsheemy | G08G 1/087 |
| 11,200,802 | B1 | 12/2021 | Edwardson | |
| 2018/0082582 | A1 * | 3/2018 | Baller | G08G 1/087 |
| 2020/0160701 | A1 * | 5/2020 | Mobasser | G08G 1/0145 |
| 2021/0248904 | A1 * | 8/2021 | Nguyen | G08G 1/012 |
| 2024/0021076 | A1 * | 1/2024 | Menard | G08G 1/096733 |
| 2024/0185714 | A1 | 6/2024 | Jha et al. | |

* cited by examiner

*Primary Examiner* — Kerri L McNally

(74) *Attorney, Agent, or Firm* — Harness, Dickey & Pierce, P.L.C.

(57) ABSTRACT

A traffic management system and method for operating the same includes a plurality of roadside devices associated a plurality of intersections. A control module is programmed to receive priority requests from priority connected vehicles that comprise a priority level associated with a type of vehicle. The control module generates average estimated arrival time for an intersection for the vehicles based on historical data, receives roadside device data from a plurality of roadside devices, estimates congestion and flow dynamics for the priority connected vehicles based on the average estimated arrival times and real-time data from the vehicles and data from the roadside devices, determines adapted arrival times based on the congestion and flow dynamics and adjusts a signal phase and timing for a traffic signal of the intersection for the priority connected vehicles based on the priority and adapted arrival times. A traffic signal operates with the signal phase and timing.

20 Claims, 4 Drawing Sheets

SYSTEM AND METHOD FOR OPERATING A TRAFFIC MANAGEMENT SYSTEM BASED ON PRIORITY VEHICLE ARRIVAL TIME

CROSS-REFERENCE TO RELATED APPLICATION

This application claims the benefit of U.S. Provisional Application No. 63/567,629 filed on Mar. 20, 2024. The entire disclosure of the above application is incorporated herein by reference.

TECHNICAL FIELD

The present disclosure relates to a traffic signal controls, and, more particularly, to a system and method for traffic signal control classifying intersection crash risk priority.

BACKGROUND

This section provides background information related to the present disclosure which is not necessarily prior art.

Current transportation system involves multiple system participants and modes, encompassing passenger cars, transit vehicles, pedestrians, bicycles, trucks, emergency vehicles, as well as both commercial and private modes of transportation. Traditional traffic signal control systems typically focus on managing either the overall traffic flow or individual modes. For instance, techniques like signal coordination and phase actuation aim to create a green wave for passenger cars along a sequence of signalized intersections. On the other hand, Signal Preemption policies prioritize emergency vehicles, ensuring their prompt passage. Additionally, Transit Signal Priority is implemented to facilitate the movement of transit vehicles, such as buses and trains with minimum impact on other modes of transportation.

Addressing each mode independently could lead to suboptimal system performance, given the unique characteristics and priority levels associated with each mode. There are two main strategies, viz., passive and active. Passive strategies employ fixed signal settings to reduce delay for transit vehicles, involving actions such as adjusting green time, shortening cycle lengths, implementing split phasing, and coordinating signals to enhance transit efficiency. A common issue with passive strategies is that they may make the intersection operate less efficiently overall. On the other hand, active priority involves dynamic detection and real-time adjustments to signal settings, aiming to effectively minimize delays. However, devising signal plan policies based on active strategies and real-time events requires accurate estimation of the arrival time of priority vehicles.

SUMMARY

This section provides a general summary of the disclosure and is not a comprehensive disclosure of its full scope or all of its features.

The present disclosure provides multi-mode priority system not only addresses each traffic mode individually but also considers the overall efficiency of the entire traffic system. Also, this innovation utilizes Vehicle-to-Infrastructure information to enhance the precision of priority vehicle arrival time estimation. In this approach, the arrival time of priority vehicle is estimated through a statistical algorithm and the accuracy is further enhancing accuracy through a Bayesian posterior approach that incorporates Vehicle-to-Infrastructure data.

In one aspect of the disclosure, a method for operating a traffic management system includes receiving priority requests from priority connected vehicles, said priority requests comprising a priority level associated with a type of vehicle, generating an average estimated arrival time for an intersection for the priority connected vehicles based on historical data, receiving roadside device data from a plurality of roadside devices, estimating congestion and flow dynamics in front of the priority connected vehicles based on the average estimated arrival times and real-time data from the vehicles and data from the roadside devices, determining adapted arrival times based on the congestion and flow dynamics, adjusting a signal phase and timing for a traffic signal of the intersection for the priority connected vehicles based on the priority and adapted arrival times and operating the traffic signal with the signal phase and timing.

In another aspect of the disclosure, a traffic management system includes a plurality of roadside devices associated a plurality of intersections. A control module is programmed to receive priority requests from priority connected vehicles that comprise a priority level associated with a type of vehicle. The control module generates average estimated arrival time for an intersection for the vehicles based on historical data, receives roadside device data from a plurality of roadside devices, estimates congestion and flow dynamics in front of the priority connected vehicles based on the average estimated arrival times and real-time data from the vehicles and data from the roadside devices, determines adapted arrival times based on the congestion and flow dynamics and adjusts a signal phase and timing for a traffic signal of the intersection for the priority connected vehicles based on the priority and adapted arrival times. A traffic signal operates with the signal phase and timing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1A:
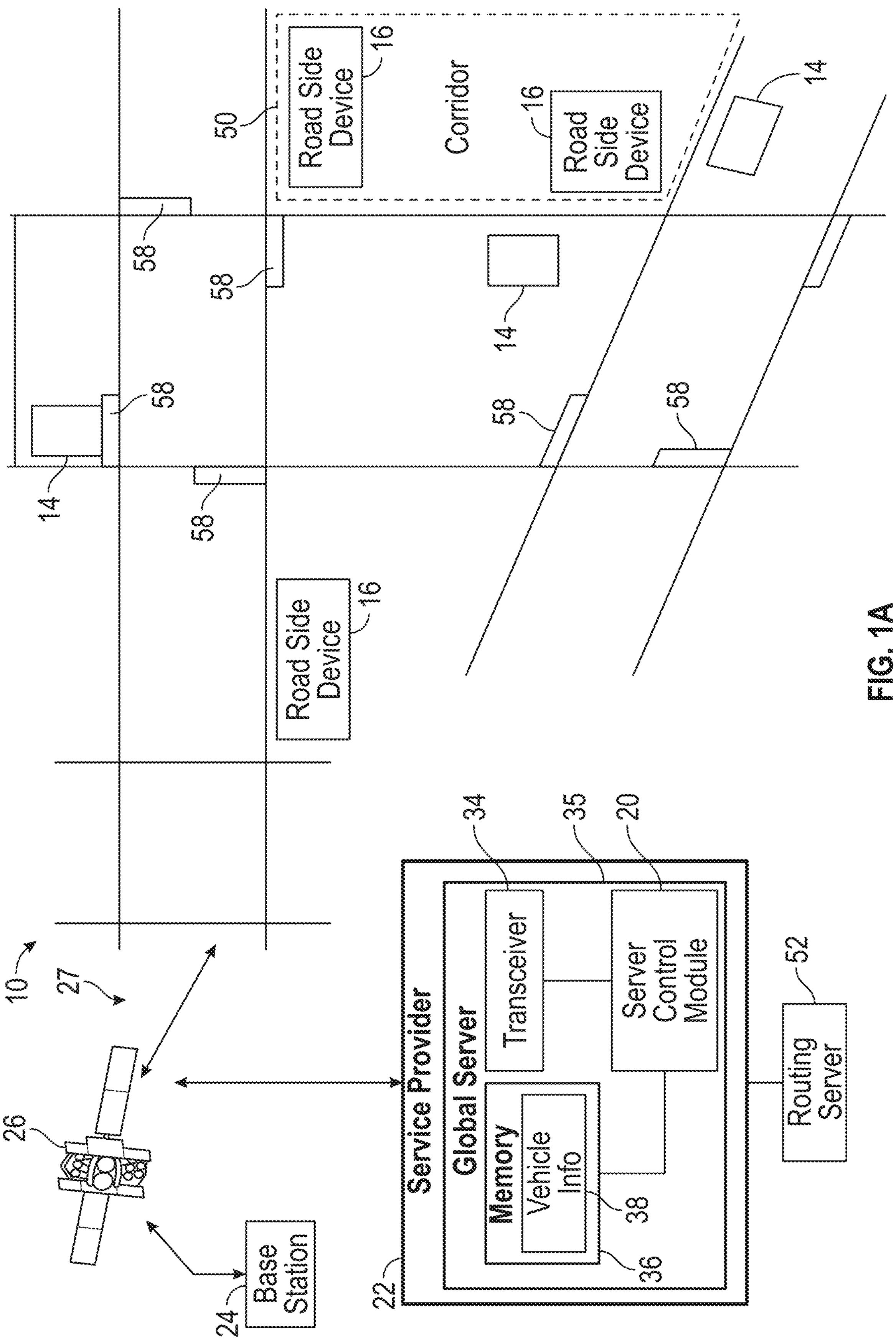
FIG. 1A is a functional diagram of a traffic management system according to the present disclosure.

Example embodiments will now be described more fully with reference to the accompanying drawings.

Recent intelligent vehicles include various sensors and communication devices, which are used to understand host vehicle behavior, driver behavior, and behavior of other vehicles. Driver assistance is provided based on outputs of the sensors, current operating conditions, and a detected operating environment. For example, a steering wheel angle, a brake pedal position, and an accelerator pedal position may be monitored to determine driver behavior while external radar sensor signals and camera images may be monitored to detect a current vehicle environment, which may include other vehicles. As an example, location and movement of lane markers, surrounding objects, signal lights, etc. may be monitored. Driver assistance may be provided to, for example, autonomously steer, brake and/or decelerate the corresponding host vehicle to prevent a collision.

A modular artificial intelligence (AI) system of a vehicle may perform autonomous actions and operate a vehicle to, for example, merge from a first lane of traffic into a second lane of traffic. A modular AI system is an AI system that is applicable to various vehicle environments and follows a set of rules to predict movement (e.g., travel path, speed/velocity, acceleration, etc. of nearby vehicles relative to a host vehicle).

Autonomous driving in past years is a leading focus point in the automotive research field and driving in urban and highway traffic is complex. Given the statistics indicating that the number of fatalities in traffic accidents in the last 10 years is 1.2 million per year, autonomous driving is expected to save millions of lives in the future. Apart from orthodox techniques and in order to provide a vehicle with some self-built intelligence, several machine learning (ML) techniques have been introduced, which allow a driving agent to learn from gathered data and improve future operations based on determined experiences. A "driving agent" or "agent" as used herein may refer to a vehicle, a vehicle control module, a driver assistance module, a RLP module, a simulation system control module, a simulated vehicle control module, or other autonomous vehicle module. An agent may refer to a combination of two or more of the stated modules. Current autonomous methods include vehicle individualized intelligence without collaboration that focus operations based on sensory inputs.

The examples provided herein include collaborative multi-agent reinforcement learning. This may be implemented, for example, on a highway, freeway, roadway, or other multi-vehicle environment. The collaborative multi-agent reinforcement learning approach may also be implemented in an actual vehicle environment, in a simulated environment, or other multi-agent environment where multiple agents are able to interact. Each of the agents is able to learn behaviors of that agent and/or corresponding vehicle and behaviors of the other agents and/or corresponding vehicles. The stated behaviors are learned over time based on feedback data, sensor data, and shared data collected in association with different environment states and performed actions. Collaborative systems are disclosed in which the agents share data about the environment and decision making information and based on this information decide on a best course of action to take next. This includes avoiding obstacles, pedestrians and rogue vehicles, which may be un-instrumented and/or non-autonomous vehicles. This aids in preventing a collision. The collaborative systems include teaching agents to drive autonomously and collaboratively in certain scenarios, such as highway scenarios.

The disclosed agents perform collaborative decision making and path planning using trained and continuous learning artificial intelligence (AI) systems to prevent single and series collisions. A single collision refers to a collision between two vehicles. A series collision refers to a multiple consecutive collisions between more than two vehicles, sometimes referred to as a "traffic pile up". Certain traffic conditions may be mixed such that the traffic includes autonomous vehicles, partially autonomous vehicles, and/or non-autonomous (manually driven) vehicles. Other traffic conditions may include only fully autonomous vehicles that are fully connected (i.e. able to communicate with each other and share information).

Roadside devices such as traffic signals may also be controlled and coordinated with the control of vehicles to reduce conflicts. By controlling timing, roadside devices can position traffic in a coordinated manner.

Figure 1B:
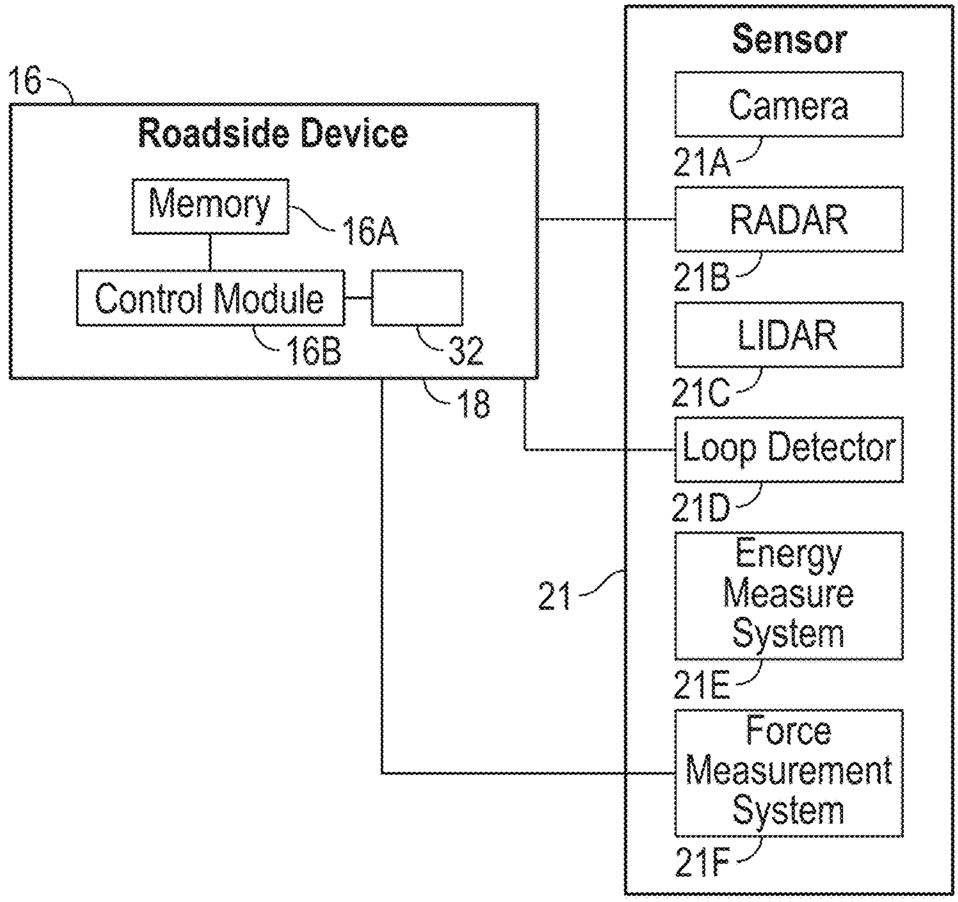
FIG. 1B is a block diagram of a roadside device of FIG. 1A.
Figure 1C:
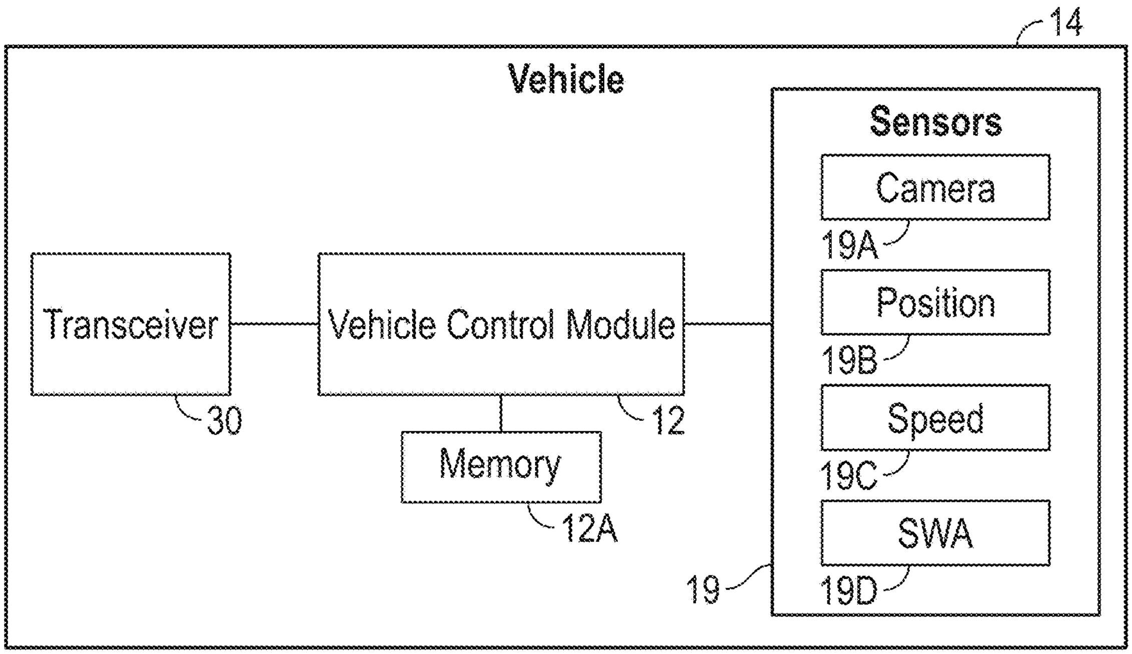
FIG. 1C is a block diagram of the vehicle of FIG. 1A.

Referring to FIGS. 1A, 1B and 1C, a traffic management system 10 in a mixed autonomous operating environment is illustrated. The traffic management system 10 may include various vehicle communication devices (or devices that transmit vehicle related data or roadside device data), such as vehicle control modules 12 of vehicles 14, roadside control modules 16 of roadside units (or roadside devices) 18, a server control module 20 of a service provider 22, and/or other communication devices, such as vehicle communication devices or roadside devices in a base station 24 or a satellite 26 which form a communication network 27. The vehicle related information 38 may include messages and/or signals including information pertaining to the vehicles 14 and/or objects within predetermined distances of the vehicles 14. As an example, the server 35 may be implemented as a cloud-based server and the server control module 20 may be implemented as a RLP module. A portion of and/or a version of the RLP algorithm described below may be implemented by each of the vehicle control modules 12, roadside control modules 16B, and the server control module 20. In addition, one or more levels of the RLP architecture disclosed herein may be implemented by the vehicle control modules 12, roadside control modules 16B, and the server control module 20.

The roadside devices 16 may also include sensors 21 generating data such as cameras 21A, radar 21B, lidar 21C, loop detector 21D, energy measurement system 21E and force measurement system 21F. The roadside devices may determine speed or velocity, acceleration and geolocations of objects. The roadside devices 18 may be referred to as a "facility" and may be a traffic light or other devices to aid vehicles.

The vehicles 14 include the vehicles control modules 12 and transceivers 30 for vehicle-to-vehicle communication and communication with the other vehicle communication devices, such as communication with transceivers 32,34 of the roadside devices 16 and the service provider 22. The vehicles 14 may also include sensors 19 such as cameras 19A or other devices to obtain geographic positions of objects, a position sensor 19B such as a global position sensor, a speed sensor 19C, an acceleration sensor (or calculation based on speed or velocity) a steering wheel angle sensor 19D.

The service provider 22 may include a global server 35, which includes the server control module 20, the transceiver 34, and a memory 36. The memory 36 may store the vehicle related information 38, such as that described herein, which may be shared with the vehicles 14. The control modules 12, 16B and 20 may be microprocessor-based and may be associated with respective memories 12A, 16A and 36. The memories 12A, 16A and 36 are non-transitory computer-readable mediums that include machine readable instructions that are executable by the processor.

The roadside devices 18 may be coupled together and referred to as a corridor 50. Various roadside devices 16 may be grouped together in a corridor 50. That is, the roadside devices 16 may act together and therefore may not include a separate device rather operation may be controlled for each of the roadside devices within the corridor 50. For example, on a certain stretch of road, the traffic signals are specific roadside devices 16 may be synchronized for a long distance. These synchronized traffic lights may be part of the same corridor 50. The corridors 50 may include their parameters collectively. The traffic signals/roadside devices 16 are illustrated relative to a stop line 58. The number of facilities and/or corridors that are in communication with the global server 35 may vary as well.

A routing server 52 may be coupled to the service provider 22. Emergency vehicles or other types of vehicles may be in communication with the routing server 52 to obtain a planned routes according to parameters within the global server 35. The routing server 52 may be incorporated within the service provider 22 although the routing server 52 is shown as a separate component. The routing server 52, the roadside devices 18 and the road users 14, all intercommunicated through various devices such as the base station 24 and/or the satellite 26.

Figure 2:
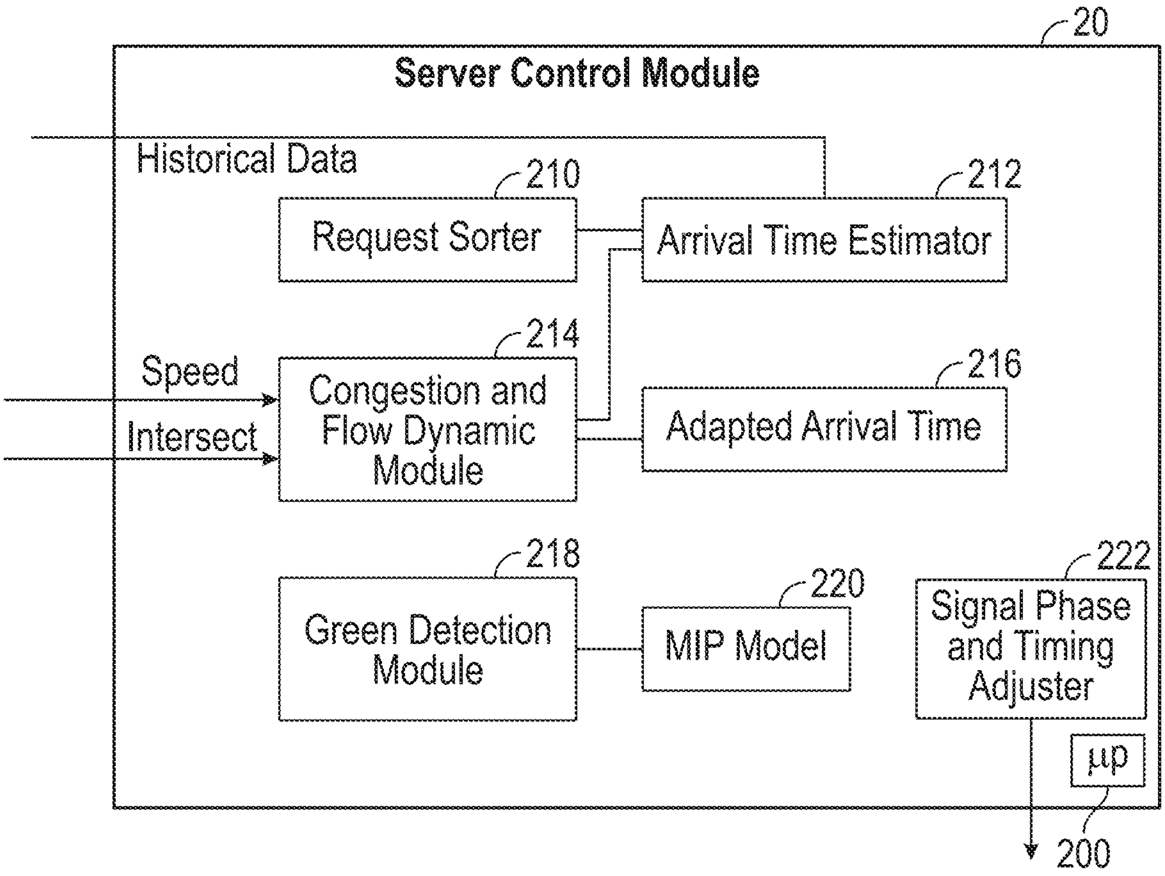
FIG. 2 is a diagram of a server control module.
Figure 3:
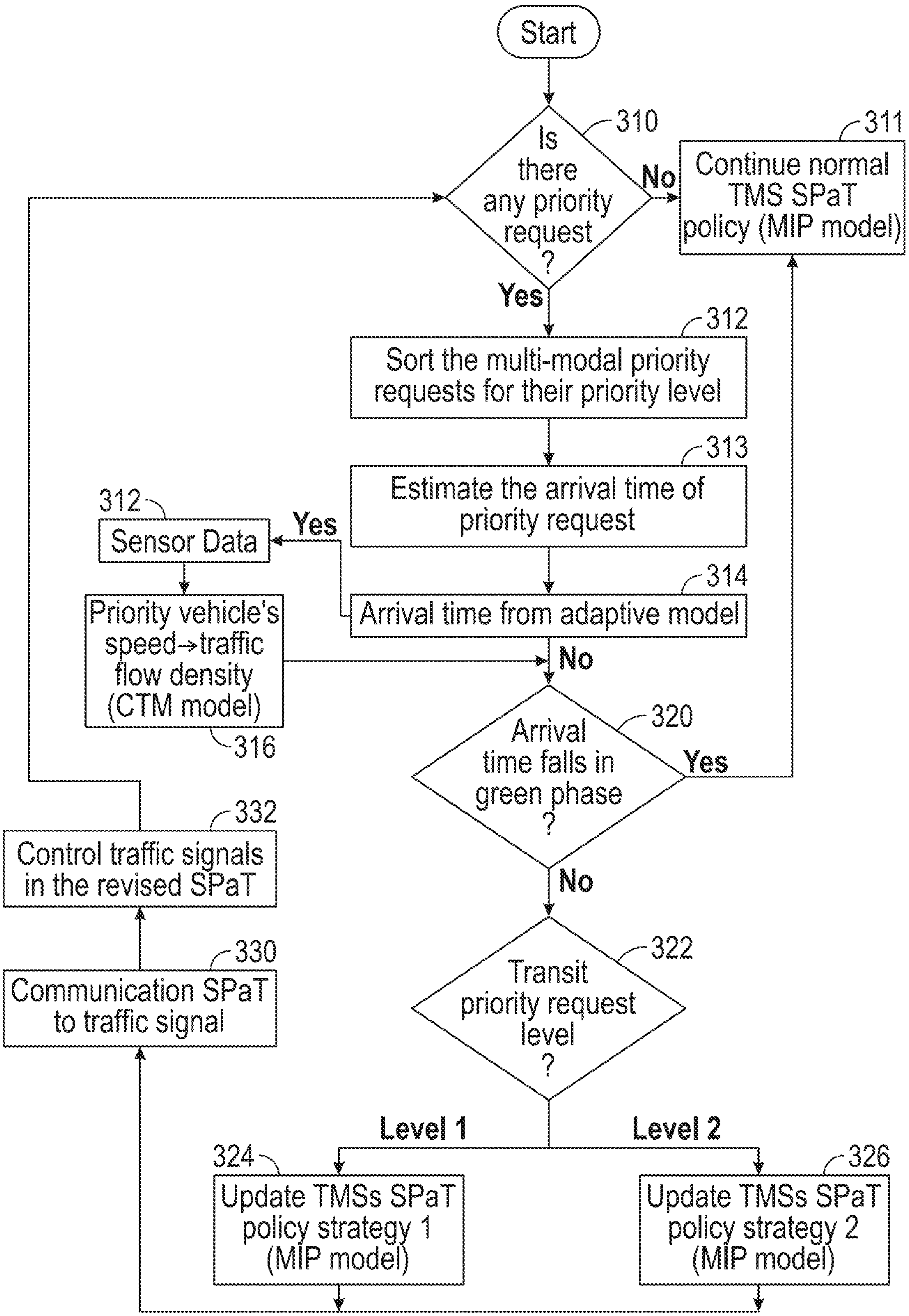
FIG. 3 is a flow chart of a method for operating the server controller module and a traffic light in the traffic management system.

Referring now also to FIGS. 2 and 3, the operation of the traffic management system 10 may take place in the control module 20 of the service provider 22 which is programmed to perform various step and control the roadside devices such as traffic signals.

Consider a four-way signalized intersection, where users with diverse priority levels are present. The assumption is that priority vehicles 14 are equipped with vehicle-to-infrastructure communication technology, allowing them to transmit priority requests. The present system and method introduces a signal control plan capable of managing real-time multiple priority requests at the intersection.

The server control module 20 is set forth in greater detail. A microprocessor or processor 200 operates together with the memory 36 illustrated in FIG. 1A. The processor 200 is programmed to execute instructions stored in the memory 36 as mentioned above. A request sorter 210 receives requests from vehicles. Each vehicle may have a priority associated therewith. Each vehicle may communicate priority requests which are received by the server control module 20 in step 310. If no priority request are received, step 311 continues the unmodified signal phase and timing of the traffic signal. The priorities are provided into two levels in this example. Level 1, designated for high priority, encompasses emergency vehicles. Level 2 is assigned to transit buses, school buses and freight vehicles. However, various numbers of priorities may be used in the traffic management system 10. In 312 three multi-modal priority requests are sorted for their priority levels. That is, each vehicle may be associated with a priority level and therefore the priority levels are sorted for each vehicle.

At each checkpoint time, the system verifies the existence of priority requests and proceeds to estimate the arrival time for each request separately at step 313 in block 212. Block 212 employs a statistical algorithm to estimate the average arrival time of connected vehicles based on the historical data, serving as an initial estimation.

To enhance accuracy, the the congestion and flow dynamic module 214 utilizes real-time data from step 312 from priority connected vehicles 14 is used to refine the arrival information in step 314 using a Bayesian posterior approach before adjusting the signal phase and timing (SPaT) policy of the traffic lights to obtain an adapted arrive time. If sensor data of step 312, such as loop detector information, camera or radar sensor is available for the intersection, the system utilizes this data in conjunction with the speed data in step 316 of priority connected vehicles to estimate congestion and flow dynamics (traffic flow density) in front of the priority vehicle. The congestion and flow dynamics provides data corresponding to the traffic resistance to reaching and travelling through an intersection. Congestion and flow dynamics represent the interplay between traffic congestion (i.e., the buildup of vehicles at an intersection) and flow dynamics (i.e., the movement and behavior of vehicles through the intersection). Together, they provide data that quantifies the traffic resistance which is the difficulty vehicles experience when approaching and traveling through an intersection. Congestion reflects the density and delays caused by high traffic volumes, while flow dynamics describe how vehicles move, accelerate, decelerate, and interact within the traffic stream. The congestion and flow dynamics may be a numerical factor indicitive of the congestion and flow dynamics individually or a single cumulative numerical indicator. This integrated approach further enhances the accuracy of arrival time estimation. The adapted arrival time is generated in block 216.

Following the determination of the adapted arrival time estimation in step 316, the system evaluates whether the estimated arrival time aligns with the current green phase at the green detection module 218 in step 320. If step 320 is true, the existing Signal Phasing and Timing plan in step 311 is continued. In step 320 if the arrival time does not align with the green phase, the system then assesses the priority level from the request in step 322. In the presence of a level-1 request, the system enacts strategy 1 in step 324, involving preemption to change the signal plan so the green phase is aligned to allow the vehicle to pass through the intersection at the arrival time. Conversely, for a level-2 request, step 326 performs the Signal Phasing and Timing plan is adjusted using strategy 2, employing a multi-modal Mixed-Integer Programming (MIP) model 220. The output of the model 220 provides signal phase and timing data from the signal phase and timing adjuster 222. The signal phase and timing data is communicated to a traffic signal or a plurality or network of traffic signals in step 330. In step 332 the traffic signals are controlled with the revised signal phase and timing based on the adapted arrival time so the timing of the green phase is aligned with the adapted arrival time. This is an iterive process that repeats as the vehicles get closer to the intersection.

The strategies for revising the signal phase and timing is set forth in the following section. The mathematical formulation for two different Signal Phase and Timing (SPaT) priorities are set forth. More than two may also be employed.

$$\text{Min } f(x) = \text{Min}\{W_1 \cdot \text{Delay(Transit, Commercial vehicle or trucks)} + W_2 \cdot \text{Delay(Emergency)} + W_3 \cdot \text{Delay(Passenger vehicle)}\} \tag{1-1}$$

$$Ax \leq B \tag{1-2}$$

$$Cx \leq D \tag{1-3}$$

$$Ex \leq F \tag{1-4}$$

"A" represents the coefficients or parameters related to flow dynamics-ex. traffic flow rates; "X" is the decision variables; B represents the upper bounds for flow dynamics-ex. maximum arrival rate; "C" represents the coefficients or parameters related to signal timing—ex. minimum green time, maximum cycle length; "D" represents the upper bounds for signal timing parameters—ex. maximum allowable green time; "E" represents the coefficients or parameters related to priority requests—ex. priority vehicle arrival rates. "F" represents the upper bounds for serving priority requests-maximum allowable delay for emergency vehicles.

Equations 1-1 through 1-4 provide the first strategy from step 324. The goal of the mathematical model is to minimize the total weighted delay for active priority requests for each vehicle. Each priority request/vehicle type is allocated a weight ($W_1$ through $W_3$) within the objective function based on the different types of vehicles such as a transit, commercial vehicle or truck with a first weight, an emergency vehicle with a second weight and a passenger vehicle with another weight, indicating its significance in receiving prompt service. The weights may be different so that emergency vehicle are prioritized followed by commercial and transit vehicles. The objective function aims to equitably distribute delays across all modes, taking into account their respective importance. Constraint set (1-2) pertains to flow dynamic constraints, while constraint (1-3) addresses signal timing constraints. Constraint (1-4) focuses on serving priority requests.

The second strategy, for emergency vehicle arrivals in this example, the primary objective is to efficiently clear the intersection as much as possible before the priority vehicle arrives, subsequently granting it the right of way. Hence, the Mixed-Integer Programming (MIP) model 220 is formulated to address this scenario to minimize delay:

$$\text{Min } f(x) = \text{Min Delay(Emergency Vehcile)} \tag{2-1}$$

$$A'x \le B' \tag{2-2}$$

$$C'x \le D' \tag{2-3}$$

The same variable definitions are used from Equations 1-1 through 1-3

The objective function minimizes the delay experienced by emergency vehicles. Constraint set (2-2) comprises flow dynamic constraints associated with the intersection, while constraint (2-3) represents signal timing constraints.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set. In this application, including the definitions below, the term "module" or the term "controller" may be replaced with the term "circuit." The term "module" or the term "controller" may refer to, be part of, or include processor hardware (shared, dedicated, or group) that executes code and memory hardware (shared, dedicated, or group) that stores code executed by the processor hardware.

The module or controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module or controller may communicate with other modules or controllers using the interface circuit(s). Although the module or controller may be depicted in the present disclosure as logically communicating directly with other modules or controllers, in various implementations the module or controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module or controller may be distributed among multiple modules that are connected via the communications system. For example, multiple modules may implement the same functionality distributed by a load balancing system. In a further example, the functionality of the module or controller may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules or controllers. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for operating a traffic management system comprising:

receiving priority requests from priority connected vehicles, said priority requests comprising a priority level associated with a type of vehicle;

generating an average estimated arrival time for an intersection for the priority connected vehicles based on historical data;

receiving roadside device data from a plurality of roadside devices;

estimating congestion and flow dynamics in front of the priority connected vehicles based on the average estimated arrival times and real-time data from the vehicles and data from the roadside devices;

determining adapted arrival times based on the congestion and flow dynamics;

adjusting a signal phase and timing for a traffic signal of the intersection for the priority connected vehicles based on the priority and adapted arrival times; and operating the traffic signal with the signal phase and timing.

2. The method of claim 1 wherein receiving priority requests from priority connected vehicles comprises receiving priority requests from a first priority vehicle comprising an emergency vehicle, the first priority vehicle having a first priority.

3. The method of claim 2 wherein receiving priority requests from priority connected vehicles comprises receiving priority requests from a second priority vehicle comprising a passenger vehicle or a commercial vehicle, the second priority vehicle having a second priority less than the first priority.

4. The method of claim 1 wherein estimating congestion and flow dynamics based on real-time data comprises refining estimating congestion and flow dynamics based on vehicle speed.

5. The method of claim 1 wherein adjusting the signal phase and timing of the traffic signal comprises changing a green phase to align at least one of the adapted arrival times.

6. The method of claim 1 wherein adjusting the signal phase and timing comprises adjusting the signal phase and timing of a plurality of traffic lights.

7. The method of claim 1 wherein receiving roadside device data comprises receiving camera data, obtaining radar data and obtaining connected vehicle data.

8. The method of claim 1 wherein receiving roadside device data comprises receiving a velocity, acceleration, an energy measurement, a force measurement and geolocations.

9. The method of claim 1 wherein determining the adapted arrival time comprises minimizing delay for an emergency vehicle.

10. The method of claim 1 wherein determining the adapted arrival time comprises assigning weights to different types of vehicles.

11. The method of claim 1 wherein determining the adapted arrival time comprises assigning weights to different types of vehicles and minimizing delays based on the weights.

12. A traffic management system comprising:

a plurality of roadside devices associated a plurality of intersections comprising traffic lights;

a control module programmed to receive priority requests from priority connected vehicles, said priority requests comprising a priority level associated with a type of vehicle;

generate an average estimated arrival time for an intersection for the priority connected vehicles based on historical data;

receiving roadside device data from a plurality of roadside devices;

estimate congestion and flow dynamics in front of the priority connected vehicles based on the average estimated arrival times and real-time data from the vehicles and data from the roadside devices;

determine adapted arrival times based on the congestion and flow dynamics;

adjust a signal phase and timing for a traffic signal of the intersection for the priority connected vehicles based on the priority and adapted arrival times; and the traffic signal programmed to operate with the signal phase and timing.

13. The traffic management system of claim 12 wherein a first priority vehicle comprising an emergency vehicle, the first priority vehicle having a first priority.

14. The traffic management system of claim 13 wherein a second priority vehicle comprising a passenger vehicle or a commercial vehicle, the second priority vehicle having a second priority less than the first priority.

15. The traffic management system of claim 12 wherein the control module is programmed to adjust the signal phase and timing of the traffic signal by changing a green phase to align at least one of the adapted arrival times.

16. The traffic management system of claim 12 wherein the control module is programmed to adjust the signal phase and timing by adjusting the signal phase and timing of a plurality of traffic lights.

17. The traffic management system of claim 12 wherein the roadside device data comprises camera data, radar data and connected vehicle data.

18. The traffic management system of claim 12 wherein the roadside device data comprises a velocity, acceleration, an energy measure, a force measurement and geolocations.

19. The traffic management system of claim 12 wherein the control module determines the adapted arrival time by minimizing delay for an emergency vehicle.

20. The traffic management system of claim 12 wherein the control module is programmed to determine the adapted arrival time by assigning weights to different types of vehicles and minimizing delays based on the weights.

* * * * *